US009286738B2

(12) United States Patent
Amon

(10) Patent No.: US 9,286,738 B2
(45) Date of Patent: Mar. 15, 2016

(54) DISTRIBUTED DATA STORAGE AND RECOVERY

(71) Applicant: Immortal Data Inc., Leesburg, VA (US)

(72) Inventor: Dale Amon, Carnegie, PA (US)

(73) Assignee: Immortal Data, Inc., Leesburg, VA (US)

( * ) Notice: Subject to any disclaimer, the term of this patent is extended or adjusted under 35 U.S.C. 154(b) by 19 days.

(21) Appl. No.: 14/286,905

(22) Filed: May 23, 2014

(65) Prior Publication Data

US 2015/0339867 A1 Nov. 26, 2015

(51) Int. Cl.
*G01M 17/00* (2006.01)
*G06F 7/00* (2006.01)
*G06F 19/00* (2011.01)
*G07C 5/08* (2006.01)

(52) U.S. Cl.
CPC *G07C 5/085* (2013.01); *G07C 5/08* (2013.01); *G07C 5/0866* (2013.01)

(58) Field of Classification Search
USPC ........... 701/1, 3, 7, 36, 9, 33, 33.4, 29.1, 4, 8; 702/104, 85, 105, 141, 144, 183; 73/1.78, 488; 340/539.13, 539.11, 340/539.1, 500; 360/32
See application file for complete search history.

(56) References Cited

U.S. PATENT DOCUMENTS

| | | | | |
|---|---|---|---|---|
| 2,992,296 | A | 7/1961 | Fritz | |
| 3,075,192 | A | 1/1963 | Ryan et al. | |
| 3,327,067 | A | 6/1967 | Boniface | |
| 4,694,119 | A | 9/1987 | Groenewegen | |
| 6,009,356 | A | 12/1999 | Monroe | |
| 6,600,963 | B1 | 7/2003 | Loise et al. | |
| 6,895,314 | B2 | 5/2005 | Ailor et al. | |
| 7,039,509 | B2 | 5/2006 | Podowski | |
| 7,113,852 | B2 | 9/2006 | Kapadia et al. | |
| 7,131,136 | B2 * | 10/2006 | Monroe | 725/105 |
| 7,183,947 | B1 * | 2/2007 | Boveja et al. | 340/945 |
| 7,634,334 | B2 * | 12/2009 | Monroe | 701/3 |
| 2003/0065428 | A1 * | 4/2003 | Mendelson et al. | 701/9 |
| 2003/0152145 | A1 * | 8/2003 | Kawakita | 375/240.12 |
| 2003/0225492 | A1 | 12/2003 | Cope et al. | |
| 2006/0187026 | A1 * | 8/2006 | Kochis | 340/539.13 |
| 2007/0076312 | A1 * | 4/2007 | Jordan | 360/32 |
| 2009/0281756 | A1 * | 11/2009 | Weed et al. | 702/104 |
| 2010/0110190 | A1 | 5/2010 | Her | |
| 2011/0055474 | A1 | 3/2011 | Resch | |
| 2011/0176617 | A1 | 7/2011 | Fagan et al. | |
| 2012/0097823 | A1 | 4/2012 | Murray et al. | |
| 2013/0141247 | A1 * | 6/2013 | Ricci | 340/870.01 |
| 2013/0151088 | A1 * | 6/2013 | Ricci | 701/51 |
| 2013/0218412 | A1 * | 8/2013 | Ricci | 701/36 |
| 2013/0244588 | A1 * | 9/2013 | Pereira | 455/73 |
| 2014/0310186 | A1 * | 10/2014 | Ricci | 705/302 |

* cited by examiner

*Primary Examiner* — Ronnie Mancho
(74) *Attorney, Agent, or Firm* — Atesa Legal LLC

(57) ABSTRACT

A data recording and recovery system includes a plurality of data storage modules distributed among a respective plurality of physical locations about a structural platform. Each module comprises a first electronic interface for receiving data from the platform and for data communication among the plurality of modules during operation of the platform. A data storage device stores at least a portion of the received data. A second electronic interface communicates with another of the plurality of modules. Tracking is enabled upon occurrence of a catastrophic event associated with the platform.

23 Claims, 4 Drawing Sheets

DISTRIBUTED DATA STORAGE AND RECOVERY

FIELD OF THE INVENTION

The invention relates generally to flight data recorder technology and more specifically to distributed data recording and data recovery systems.

BACKGROUND

Current growth in aerospace technology, including active development of spacecraft and space stations by both governments and industry worldwide, is extending air travel into space. All such airborne and spaceborne platforms, as well as many other types of vehicles and some types of stationary facilities such as power plants and oil platforms, are potentially subject to events or operator errors that can lead to catastrophic failures. Airborne and spaceborne equipment failures, collisions, and other catastrophic events endanger not only crew and passengers, but anyone in the path of falling debris.

It is desirable for both safety and economic reasons to fully understand the causes of a mishap so that corrective steps can be taken to predict and prevent future occurrences. Electronic recording has long been used to provide a record of critical events associated with catastrophic failures of aircraft. For example, U.S. Pat. No. 2,992,296 to Albrecht, issued in 1961, discloses a "Crash data recorder" that can be used in aircraft, but also is disclosed as applicable as an event recorder in other environments subject to catastrophic failures.

Flight data recorders and cockpit sound recorders, often called "black boxes" are routinely used in aircraft to provide a record of events leading up to a crash. These devices are designed to survive a crash or a breakup of the aircraft and are constructed to be strong, durable, and heat-resistant. As debris from a crash may be spread over a wide area, black boxes may also include automated radio frequency beacons or sound generators to assist investigators in locating the device following a crash. Current black boxes are generally heavy, commonly over 200 kilograms, expensive and relatively bulky devices, and despite being hardened to resist damage, remain subject to failure and to difficulty in being located by crash investigators.

These problems are amplified when considering catastrophic failure of a spacecraft or other spaceborne platform, for which flight recorder technology must withstand both hard vacuum and the rigors of atmospheric reentry, for example, from Earth's orbit. Further, the debris track created following failure of a spaceborne platform can extend over hundreds or even thousands of miles, such as was the case with the Space Shuttle Columbia crash in 2003. Improved flight data recorder technology is needed to help ensure that the causes of any such future accidents can be ascertained. In addition, for commercial spaceflight, where both cargo weight and available volume aboard a vehicle are limited and very expensive, current heavy and bulky flight recorder technology is suboptimal.

BRIEF SUMMARY

The present invention discloses novel systems, methods and devices for providing durable and recoverable electronic data records for vehicles including air and space vehicles as well as for any platform subject to catastrophic failure.

In an aspect, a data recording and recovery system comprises a plurality of data storage modules distributed among a respective plurality of physical locations about a structural platform. Each module comprises a first electronic interface for receiving data from the platform and for data communication among the plurality of modules during operation of the platform. A data storage device stores at least a portion of the received data. A second electronic interface wirelessly communicates with another of the plurality of modules. A tracking is enabled upon occurrence of a catastrophic event associated with the platform.

In some embodiments, the structural platform is selected from the group consisting of a spacecraft, an orbital platform and an aircraft.

In some embodiments, the structural platform is selected from the group consisting of a watercraft, a ground vehicle, and an industrial facility.

In some embodiments, the second interface comprises a wireless data transceiver for data communication among the plurality of modules.

In some embodiments, the second communications interface comprises a transponder for communication between one or more of the plurality of modules and a global positioning system.

In some embodiments, the tracking comprises a first module of the plurality of modules detecting and recording one or more of a geographical location, a trajectory and a velocity of a second module of the plurality of modules.

In some embodiments, each of the modules is configured to generate a wireless locator signal to facilitate recovery of the module after it comes to rest following the catastrophic failure of the platform.

In some embodiments, the first communications interface for each of the plurality of modules comprises one or more of a wired data port and an optical data port.

In some embodiments, the data comprises one or more of electronic sensor data generated on the platform, data representing an operational condition of the platform, acoustic data, and video data.

In some embodiments, the sensor data comprises one or more of temperature data, pressure data, chemical composition data and chemical concentration data.

In some embodiments, only a portion of all of the data received by the plurality of modules is stored in each module, and wherein the entirety of the data can be reconstructed from the portions of data stored by fewer than the plurality of data modules.

In some embodiments, the plurality of modules comprises at least four modules.

In some embodiments, the plurality of modules comprises at least six modules.

In some embodiments, each module is hardened to preserve data recorded therein upon one or more of exposure to vacuum, immersion in an aqueous medium, physical shock, temperatures as low as −20 degrees Celsius, and temperatures as high as 200 degrees Celsius.

In some embodiments, each of the modules is hardened to preserve data recorded therein following a fall from earth orbit through atmospheric reentry and to the earth's surface.

In an aspect, a method for recovering recorded electronic data generated on board a vehicle after the vehicle has undergone a catastrophic event, the vehicle comprising a plurality of electronic data recording modules containing the data, the method comprises detecting by a first module of a plurality of modules, a second module among the plurality of modules using a wireless communications system integrated with the first module. The first module acquires and records tracking data for the second module. The first module is recovered after the first module has come to rest following the catastrophic event. The tracking data recorded by the first module is read. A location is predicted at which the second module is likely to have come to rest, based on the tracking data.

In some embodiments, data is acquired and recorded from a global positioning system for determining a location of at least one of the first and the second module.

In some embodiments, the wireless communications system operates in a first operating mode during an initial predetermined time interval following the failure. The communications system operates in a second operating mode after the predetermined time interval. The second operating mode comprises lower power consumption than the first operating mode.

In an aspect, a data recording and recovery system comprises a plurality of data storage modules distributed among a respective plurality of physical locations about a structural platform. Each module is configured for receiving and recording electronic data generated on the platform while each module is positioned at its respective location. Each module is configured for, upon a catastrophic failure of the platform, wireless tracking of another of the plurality of modules, wireless communication with a global positioning system, and generation of a wireless locator signal to facilitate recovery of the module when it comes to rest following the catastrophic failure.

In some embodiments, the electronic data comprises one or more of a signal generated by a sensor on the platform, an audio signal generated aboard the platform, a video signal generated aboard the platform and a signal generated due to an action by personnel aboard the platform.

In some embodiments, the wireless tracking comprises detecting and recording one or more of a geographical location, a trajectory and a velocity of the other one of the plurality of modules.

In an aspect, a data recording and data recovery module for mounting to a structural platform, the module being one of a plurality of modules in a data communications network, comprises a first electronic interface configured for receiving data generated on the platform and for sharing the data among the plurality of modules. A data storage device stores at least a portion of the received data. A second communications interface is configured for operation following a catastrophic failure of the platform. The second interface is configured for wireless communication between the module and a global positioning system and for wireless communication among the plurality of modules. A housing substantially encapsulates the module. The housing is hardened to protect the module from damage associated with the catastrophic failure.

In some embodiments, the wireless communication among the plurality of modules comprises tracking by the module of one or more of a location, a trajectory and a velocity of another of the plurality of modules.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
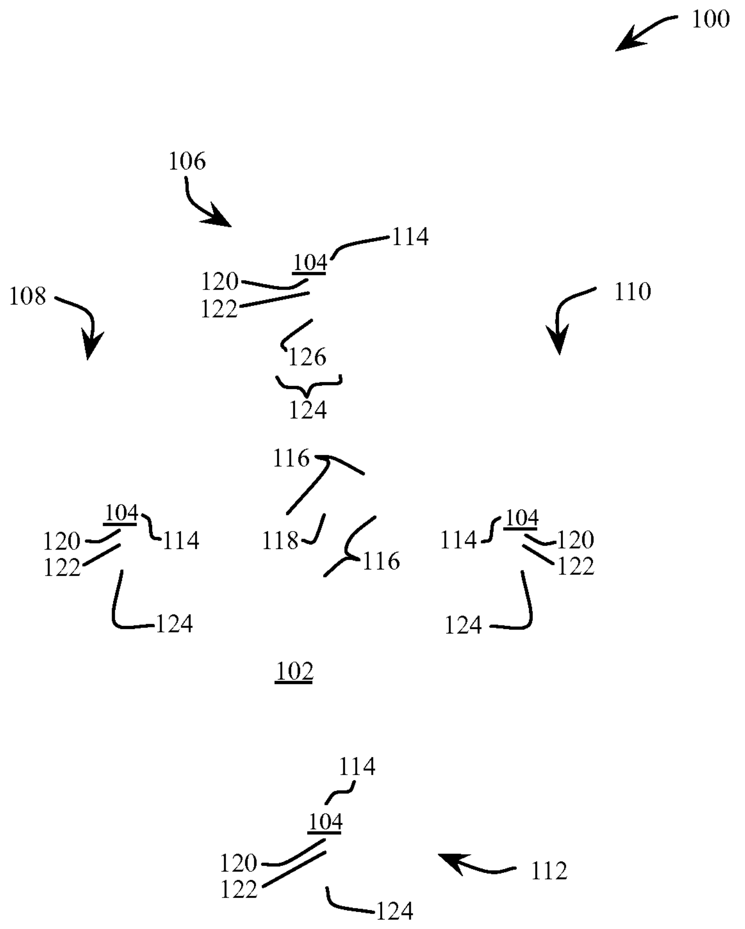
FIG. 1 schematically illustrates an embodiment of a data recording and data recovery system according to the present invention.

Disclosed herein are novel embodiments of systems, methods and devices for recording electronic data during normal operation of a structural platform and for reliable recovery of the recorded data following a catastrophic failure or other destructive event, hereinafter a "catastrophic event" associated with the platform. In various embodiments, the platform is one of an airborne or spaceborne vehicle and an orbital platform.

One skilled in this art will recognize that systems, methods and devices according to the present invention can be effectively deployed for data recording and recovery associated with any type of vehicle or transportation system, as well as for data recording and recovery associated with stationary facilities at risk of a catastrophic event. Examples of additional applicable vehicles include but are not limited to fresh and salt water vessels and transports, railway vehicles, and road vehicles such as trucks, buses and automobiles. Examples of applicable stationary facilities include but are not limited to electrical power generation plants, nuclear powered facilities, energy or fuel storage facilities, oil drilling rigs and chemical manufacturing facilities. The term "platform" is used herein to mean any vehicle or facility that is entirely or largely self-contained and for which data regarding its operational history or status can be at risk of destructive loss due to a catastrophic event.

Data storage and recovery systems, for example, current "Black Box" flight data and voice recorders used in aircraft, generally record data in a single storage unit, and data recovery following a crash depends upon recovery in working order of the single unit. In contrast, systems according to the present invention comprise a plurality of small, lightweight, electronically networked data storage modules that are physically distributed about a platform and individually hardened to survive separation from the platform, or a catastrophic event associated with the platform. Depending on the data storage capacity of each module, and on data transfer rates among the modules within the network, all of the required data can be stored in each of the modules, that is, providing redundant storage, or the data can be distributed as data shares among the modules, where recovery of all of the data following a catastrophic event requires recovery of only a fraction of the plurality of modules. Storage of data as data shares among geographically distributed storage locations allows for recombination of data into a complete data record.

During normal operation of the platform, the plurality of modules are networked together using a first communications interface. The interface can comprise any type of high-reliability electronic networking known in this art. In currently preferred embodiments, the network comprises one or more hardware connections for each module, such as wired or optical fiber connections. In another embodiment the network is wireless among the plurality of modules. Other communications protocols that provide reliable communication among the modules are envisioned in systems according to the present invention. In an embodiment, the network includes one or more of a wired Ethernet network and a Universal Serial Bus (USB) network. In one embodiment, communication among the modules includes USB 3.0 connections.

In another embodiment, the first interface comprises a data network for receiving data from sources about the platform and, independent of the data network, a storage network for communicating data among the plurality of modules. In a further embodiment, the first interface for each module comprises a first data port for connection to the storage network and a second data port for connecting to the data network. In a still further embodiment, data delivered to a first module of the plurality of modules via the data network is shared among the plurality of modules via the storage network. One or both of the storage network and the data network can include one or more network data switch, for example, an ethernet switch, to facilitate data communication among the modules or to facilitate the routing of multiple data streams to a module.

Each module includes one or more data storage devices that can be any type of high capacity, durable data storage device. In general, it is advantageous to employ the largest capacity high-reliability data storage devices available, within system size constraints. Currently preferred data storage devices for the modules are solid state rewritable memory devices such as flash memory devices known in this art, although data storage using any technology that may be available for compact, high capacity and durable data storage is intended to be within the scope of the present invention. Compact flash memory devices are commercially available with memory capacities up to one Terabyte in commercial package volumes of less than 40 cubic centimeters, and higher storage density devices are expected to become available in the near future, as solid state memory device technology is evolving rapidly.

Any type or types of electronic data can be stored in a module according to the present invention. In one embodiment the data storage capacity in a module is adequate to store all of the data received from the platform during a predefined interval of use of the platform, for example, for the duration of a flight of a spacecraft. In another embodiment, the data storage capacity per module is limited to less than the total quantity of data desired to be stored during the predefined interval, and the data for storage is selected from the total data stream for its potential utility in a later analysis of events occurring during operation the platform and leading up to a catastrophic event. In yet another embodiment, the data is structured into data shares for distribution among the modules via the storage network, so that fewer than all of the modules would be required to reconstruct all of the stored data upon recovery of surviving modules following a catastrophic event. In a further embodiment, the data shares are encoded to protect the data from unauthorized recovery following a catastrophic event.

In another embodiment, data is stored in the modules on a rolling basis, where older information is one or both of erased and transmitted to another location outside the platform, making room for new data to be stored in the modules. In one embodiment, the data is continuously streamed wirelessly from the platform to a base station external to the platform, and the data recording and recovery system according to the present invention serves as a buffer for storing data that has yet to be transmitted, due to transmission bandwidth limitations.

Nonlimiting examples of sources of data that can be recorded in a module according to the present invention include one or more of acoustic signals, video signals, and signals derived from various sensors on board the platform, including but not limited to sensors for measuring temperature, pressure, chemical composition, a presence or a concentration of a chemical species, electrical, magnetic and electromagnetic sensors. The data for storage can also include operational data for the platform, such as system status indicators and records from computers aboard the platform.

Each module of the plurality of modules also includes a second communications interface. The second interface provides wireless communication among the plurality of modules that remain functional upon the occurrence of a catastrophic event associated with the platform. In one embodiment, operation of the second interface is automatically triggered upon detection of the catastrophic event. Detection of the event can be by any means suitable for the particular platform. In various nonlimiting embodiments, detection of the event comprises one or more of a signal indicating the catastrophic event being delivered via the first interface to a module, a failure of the first interface, a loss of externally supplied electrical power to one or more module, and physical disconnection of a module from the platform.

In another embodiment, operation of the second interface can also be engaged manually by one or both of a signal initiated by a human occupant of the platform, and a signal delivered to the platform from a remote location. In various nonlimiting embodiments, an occurrence triggering operation of the second interface comprises one or more of a major systems failure aboard the platform, a serious operator error aboard the platform, a collision of the platform with another object, physical breakup of the platform, and the platform encountering an unsafe environmental condition.

The second communications interface is wireless and in preferred embodiments is independent of any physical or electrical connection among the plurality of modules or between any of the plurality of modules and the platform. The second interface can comprise any type of communications technology known in this art that can provide reliable wireless communications among electronic devices, and can include one or more types of wireless communication. In an embodiment, the second interface is a radio frequency interface. In various embodiments, the second interface comprises one or more radio frequency transponder, tracking transponder, wireless transceiver, wireless router or other known wireless communication device. In yet another embodiment, the second interface includes optical communication among the plurality of modules. The wireless interface is configured to provide one or more of data communication among the plurality of modules and tracking of modules by one another among the plurality of modules, or among modules remaining functioning during and following a catastrophic event. In an embodiment, the tracking comprises one or more module detecting and recording in a data storage device one or more of a relative location, a trajectory and a velocity of another module of the plurality of modules.

In a further embodiment, the second interface comprises wireless communication between one or more modules and a Global Positioning System (GPS). In one embodiment, each module comprises a GPS transceiver. In an embodiment, the GPS communication facilitates absolute location and trajectory tracking of one or more of the plurality of modules. Wireless communications for data transfer, tracking of electronic devices, and accessing an orbital GPS are all known in this art. In an embodiment, the wireless interface is configured to provide a wireless network among the plurality of modules. In another embodiment, the second interface for one or more modules is configured to transmit a locator beacon. The locator beacon can be one or more of a transmitted radio frequency signal, an acoustic signal and an optical signal, to assist investigators in finding the module following a catastrophic event associated with the platform. In an embodiment, the locator beacon operates intermittently to conserve electrical energy stored in the module.

Each module further includes a digital control system that can comprise a computer Central Processing Unit (CPU) or any other type of control system for controlling one or more of the operation of the first and the second interface, routing of data to and from the data storage device, monitoring and controlling energy consumption of the module, and setting an operating mode of the module. The electronic components of the module can be configured in any manner consistent with reliable operation of the module. In one embodiment, the first interface, the second interface, the controller and the data storage are configured as a single circuit board. In another embodiment, these same component subsystems comprise a large scale integrated circuit. In yet another embodiment, each of these component subsystems comprises an independently packaged member interconnected with one or more other of the component subsystems.

Each module also includes an electrical energy storage device to provide a reliable source of electrical power to the second communications interface. In various embodiments the energy storage device comprises one or more of a rechargeable battery and capacitive storage, such as one or more ultracapacitors. In an embodiment, operation of the second interface begins in a first, high power operating mode in which communications among the plurality of modules is enabled, and later switches to a second, lower power operating mode that does not include communication or tracking among the plurality of modules. In an embodiment, the second mode comprises operation of a locator beacon. Various criteria can be used to determine when to switch between these operating modes. In one embodiment, switching from the first mode to the second mode occurs following a predetermined time interval of operation in the first mode. In one embodiment this interval is less than five minutes. In another embodiment, switching from the first mode to the second mode is triggered when stored electrical energy in a module falls below a predetermined level. Without deviating from the principles of the present invention, additional operating modes can be provided, for example, intermittent operation modes or modes specific to controlling the operation of GPS communication functions.

Now turning to the figures, FIG. 1 schematically illustrates an embodiment of a data recording and recovery system 100 according to the present invention. The system 100 is seen to be mounted to a structural platform 102. For illustrative purposes, the platform 102 of FIG. 1 is schematically shown as an aircraft, but systems according to the present invention can equally and flexibly be installed on spacecraft, space stations, or other structural platforms as disclosed hereinabove. The system 100 is seen to comprise a plurality of data storage modules 104 that can be embodiments of the data modules as disclosed hereinabove, positioned in a corresponding plurality of locations 106, 108, 110, 112 about the platform 100.

A system according to the present invention can include any number of modules. In general, the robustness of the system increases with the number of modules. That is, the larger the number of modules, the higher is the probability that data can be recovered from one or more module following a catastrophic event associated with the platform. In one preferred embodiment, the system 100 comprises at least four modules 104, as illustrated in FIG. 1. In another embodiment, the system 100 comprises at least six modules. In a preferred embodiment, each one of the plurality of modules is functionally equivalent to the others of the plurality of modules.

The locations, mounting methods and distribution of modules 104 comprising the system 100 will depend on the nature and configuration of the platform 102. In the embodiment illustrated in FIG. 1, modules 104 can be seen to be located near the cockpit 106, each of the wings 108, 110, and the tail section 112. Other examples of locations that can be desirable for positioning modules according to the present invention include but are not limited to locations in proximity to an engine, to a landing gear bay, to an auxillary power unit, and to a wing root. Nonlimiting criteria used to determine number and locations of modules comprising a system according to the present invention include selecting locations in proximity to sensors or other data sources present on the platform, locations where space to mount a module is available, locations to which cable routing is convenient, locations where the likelihood of a module surviving a catastrophic failure is high, and locations distributed about the platform in a manner that in the event of a catastrophic event, relative trajectories among the modules have the potential to reveal information concerning the nature or dynamics of the event.

Each of the plurality of modules 104 comprises, as described hereinabove, first and second communications interfaces, a data storage device, an energy storage device, and a controller. The modules 104 are additionally described hereinbelow. In an embodiment, the first interface for each of the modules 104 comprises a first data port 114 for connection to a storage network 116. To facilitate communication among the plurality of modules, the storage network 116 can include one or more storage network switch 118 that can be any high-reliability network switch complying with a communications protocol of the storage network 116. In an embodiment, the first interface also includes a second data port 120 comprising a data network 122 for receiving data from various data sources 124 on board the platform 100. The data network 122 can also include one or more data network switch 126 to facilitate data routing from one or more of the data sources 124 to one of the modules 104. The data network switch can be any network switch complying with a communications protocol of the data network. The data sources 124 can comprise any of the types of data sources disclosed hereinabove. In various embodiments, one or more of the data sources 124 and the data network 122 additionally comprise analog-to-digital conversion of an analog signal from the one or more of the data sources 124.

Under normal operation of the system 100, data originating from any source on the platform 102 and entering the data network 122 can in various embodiments be copied redundantly among the modules 104 via the storage network 116, or distributed among the plurality of modules 104 using any of the methods for data storage and distribution disclosed hereinabove.

Figure 2:
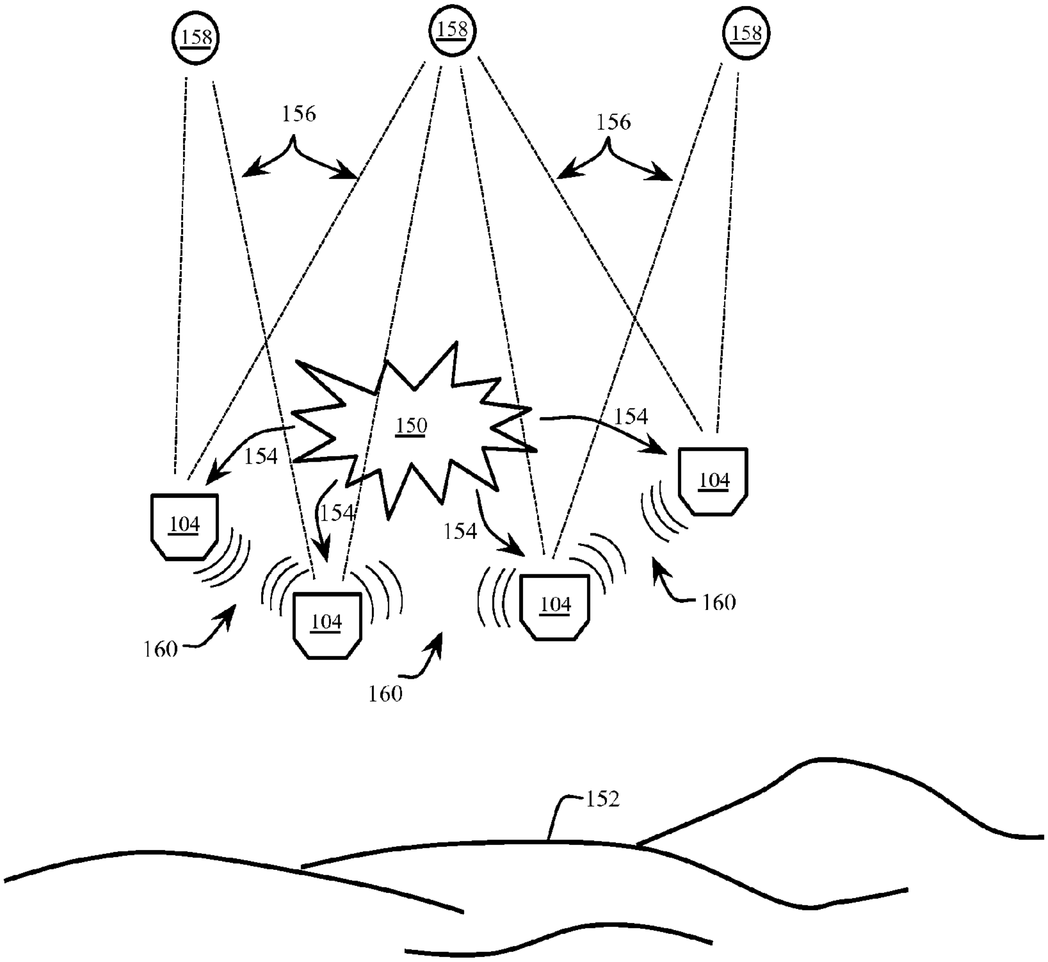
FIG. 2 schematically illustrates an embodiment of operation of a data recording and data recovery system according to the present invention, following catastrophic failure of a structural platform such as an airborne or spaceborne platform.

FIG. 2 schematically illustrates an embodiment of the system 100 illustrated in FIG. 1, shortly after the platform 102 has experienced a catastrophic event 150, illustrated as a starburst above the ground 152 in FIG. 2. A catastrophic event can potentially have many different outcomes with respect to a system according to the present invention. As illustrated in FIG. 2, the catastrophic event 150 results in each of the modules 104 being separated from and leaving the location of the platform along different respective trajectories 154, illustrated as arrows in FIG. 2. Many other catastrophic scenarios are possible, including but not limited to the destruction or damaging of one or more of the modules 104, one or more of the modules 104 remaining attached to portions of or debris from the platform 102, or the modules 104 remaining connected to the platform 102 after it has been damaged. The scenario illustrated in FIG. 2, however, can serve as a representative model for describing operation of the system 100 following the catastrophic event 150.

Upon the occurrence of the catastrophic event 150, a second communications interface becomes operational for each surviving (functioning) module of the plurality of modules 104. The second interface, as described hereinabove, comprises one or more of a locating beacon (not illustrated in FIG. 2), wireless communication 156 with a GPS system 158 and, if two or more of the plurality of modules 104 survive the catastrophic event 150, wireless communication 160 among the surviving modules, where the wireless communication 160 can comprise one or both of data communication between modules 104 and tracking of one by another of the modules 104.

Tracking data obtained using the second interface according to the present invention is of limited duration, as modules traveling along diverving trajectories following a catastrophic event may quickly move out of a practical tracking range of one another. In one embodiment, the maximum practical tracking range between modules is approximately one kilometer. In another embodiment, the range is five kilometers. In addition, it is desirable to limit the amount of stored electrical energy used by each module to perform tracking, before the module switches to a low power consumption mode that does not include tracking of other modules. In an embodiment, the low power mode conserves electrical energy stored in a module to ensure that there is sufficient reserve energy to operate the locating beacon after the module comes to rest.

Tracking data stored in one or more recovered module can be used to improve a probability of also recovering a tracked module that might not otherwise be locatable, for example, in a scenario in which a locating beacon from the tracked module cannot be detected by investigators of a crash site. In an embodiment of a method for recovering data modules according to the present invention, first and second data storage module are mounted to a platform that is then subject to a catastrophic event causing the first and the second module to follow diverging trajectories toward Earth. For a period of time following the catastrophic event, the first module tracks the second module and stores the obtained tracking data in a data storage device. The first module is recovered after coming to rest following the catastrophic event and the tracking data for the second module is extracted from the first module. The extracted tracking data is then used to calculate and extrapolate a trajectory of the second module, enabling prediction of a location on Earth at which the second module is likely to have come to rest, thereby limiting the area in which a search for the second module may be productively conducted.

In another embodiment, the tracking data is used to assist in the development of a model of the catastrophic event. For example, data regarding the relative trajectories of two or more modules known to have originated in specific locations on a platform before a catastrophic event can be used to assist in determining one or more of the physical location on the platform of a failure, impact or explosion, and the dynamics of a breakup of the platform. In an embodiment, each of the modules comprising a system according to the present invention includes a unique identifier that can support identification of the module as having been mounted in a specified location aboard the platform before the occurrence of the catastrophic event.

Figure 3:
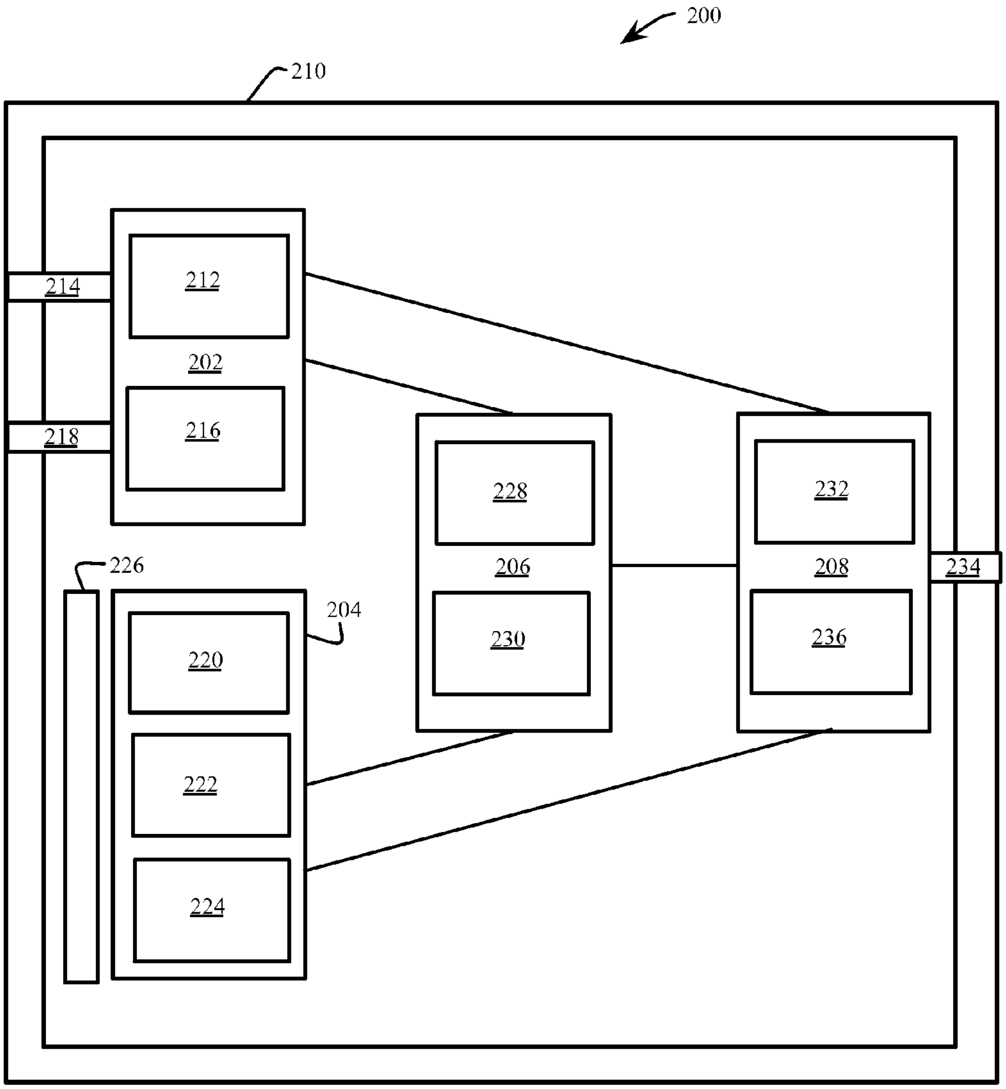
FIG. 3 is a functional block diagram of an embodiment of a data module for operation as one of a plurality of modules comprising a data recording and data recovery system according to the present invention.

FIG. 3 is a functional block diagram of an embodiment of a data module 200 for operation as one of a plurality of modules comprising a data recording and data recovery system according to the present invention. The system is mounted to a structural platform that can be any of the structural platforms disclosed hereinabove according to the present invention. Only the one module 200, and no connected external components or larger scale systems are illustrated in FIG. 3. In FIG. 3, the arrangements and groupings of components of the data module 200 are illustrated to support clarity in functional descriptions only and are not to be interpreted as limiting of a physical construction or layout of the module 200. The data module 200 is seen to functionally comprise a first communications interface 202, a second communications interface 204, a data processing and data storage section 206, an energy storage section 208, and a protective housing 210.

In an embodiment, the first interface 202 comprises storage network electronics 212 and a corresponding storage network port 214 for connection to a storage network as disclosed hereinabove. The storage network is used to share data among the plurality of modules. The first interface 202 also comprises data network communication electronics 216 and a corresponding data network port 218 for receiving data originating from one or more data source about the platform and that can be any of the data sources disclosed hereinabove. Each of the storage network 214 and the data network 216 can be any type of digital data network configured for reliably transferring data among electronic devices, including but not limited to an ethernet network and a USB based network.

In various embodiments, each of the storage network port 214 and the data network port 218 comprises one or more of an electrical connector, an optical fiber connector, and a wireless radio frequency coupling compatible with the respective network. In an embodiment, each of the storage network port 214 and the data network port 218 comprises one or more seal or protective cover at the housing 210 to protect the module 200 if the platform experiences a catastrophic event. In an embodiment the connectors are aerospace grade, hermetically sealed connectors. In another embodiment, the functions of the storage network 212 and the data network 214 are combined and comprise a single network for both receiving data from one or more data source and for sharing data among the plurality of modules.

The second interface 204 comprises wireless communication electronics 220 to support one or both of wireless data communication and mutual tracking among the plurality of modules if the platform experiences a catastrophic event. In an embodiment, the second interface 204 also comprises a GPS transponder 222 for accessing a GPS system to determine and store absolute geographical location data for the module 200 and, in one embodiment, absolute geographical location data for one or more other data module among the plurality of modules. In an embodiment, the wireless communication electronics 220 and the GPS transponder 222 provide the module with data that, when stored in and later downloaded from the module, support the recovery of additional data modules following a catastrophic event. In additional embodiments, the second interface 204 also comprises a locator beacon 224 that in one embodiment transmits an intermittent radio frequency signal to support discovery of the location of the module after the platform experiences a catastrophic event. In other embodiments the locator beacon 224 comprises one or more of an acoustic emitter and a light emitter.

The second interface 204 is also seen to comprise one or more communications antenna 226. In one embodiment, the one or more antenna 226 is a single antenna configured for radio frequency transmission and reception as required to support communication and tracking among the plurality of modules, GPS communication, and transmission of a locator signal. In another embodiment, the one or more antenna 226 comprises different antennas for different wireless communication functions. In one embodiment, at least one of the one or more antenna 226 is located external to at least a portion of the housing 210. In another embodiment, the one or more antenna 226 is located inside the housing 210 and at least an overlying portion of the housing 210 is fabricated from a radio transparent material to support the passage of radio frequency signals through the housing 210.

The data processing and data storage section 206 of the module 200 is seen to comprise a digital controller 228 that can be a computer CPU or another type of controller as disclosed hereinabove, and a data storage device 230, also as disclosed hereinabove, that in an embodiment comprises flash memory. The energy storage section 208 comprises a rechargeable electrical energy storage device 232 configured to supply, at least upon occurrence of a catastrophic event, electrical power to the to the data processing and data storage section 206 and to at least the second interface 204. Rechargeable batteries and capacitive electrical energy storage devices suitable for this purpose are well known in this art. In another embodiment, all electrical power used by the module is sourced through the energy storage device 232.

The energy storage section 208 also is seen to comprise comprises a power coupling port 234 for receiving electrical power from an external power source. In one embodiment the power coupling port 234 comprises an electrically coupled power connector. In another embodiment, the power coupling port 234 comprises wireless power coupling through the housing 210. In a further embodiment, the wireless power coupling comprises inductive coupling. In an embodiment, the power coupling port 234 comprises one or more seal or protective cover at the housing 210 to protect the module 200 if the platform experiences a catastrophic event.

In an embodiment, the energy storage section 208 also comprises a power conditioning device 236. In one embodiment, the power conditioning device 236 is a DC to DC voltage converter configured to adjust a nonoptimal voltage of electrical power received by the module 200 from an external source to an optimal voltage for use by the module 200. In one embodiment, the electrical power received from the external source is used exclusively to charge the energy storage device 232, and all electrically powered functions of the module receive power from the energy storage device 232. In another embodiment, at least some of the electrical power used by the module 200 is sourced through the power conditioning device 236 but not through the energy storage device 232 during normal operation of the platform, and the energy storage device 232 is used to provide electrical power to the module 200 exclusively or primarily upon the occurrence of a catastrophic event associated with the platform.

The housing 210 is configured to minimize the risk of damage to or failure of the module 200 upon the occurrence of a catastrophic event associated with the platform, and upon subsequent environmental exposure of the module 200, both immediately after the event, and after coming to rest following the event. Depending on the type of platform, its use, and environments in which it may be operated, modules according to the present invention may be exposed to physical shock, temperature extremes, vacuum and other extreme environmental conditions upon occurrence of a catastrophic event.

In one embodiment, the housing 210 comprises multiple layers of protective materials including one or more of an ablative heat shielding materials such as a Phenolic Impregnated Carbon Ablator (PICA) or cork, a thermally insulative material, a crushable material for absorbing a shock of an impact, a hermetic seal, waterproofing, and other protective layers. In another embodiment, one or both of the interior of the housing and the electronic components within are padded with respect to one another for damage protection. In yet another embodiment, the housing 210 comprises a rigid frame to which protective materials are coupled and which comprises mounting features for mounting the module 200 to the platform.

Figure 4:
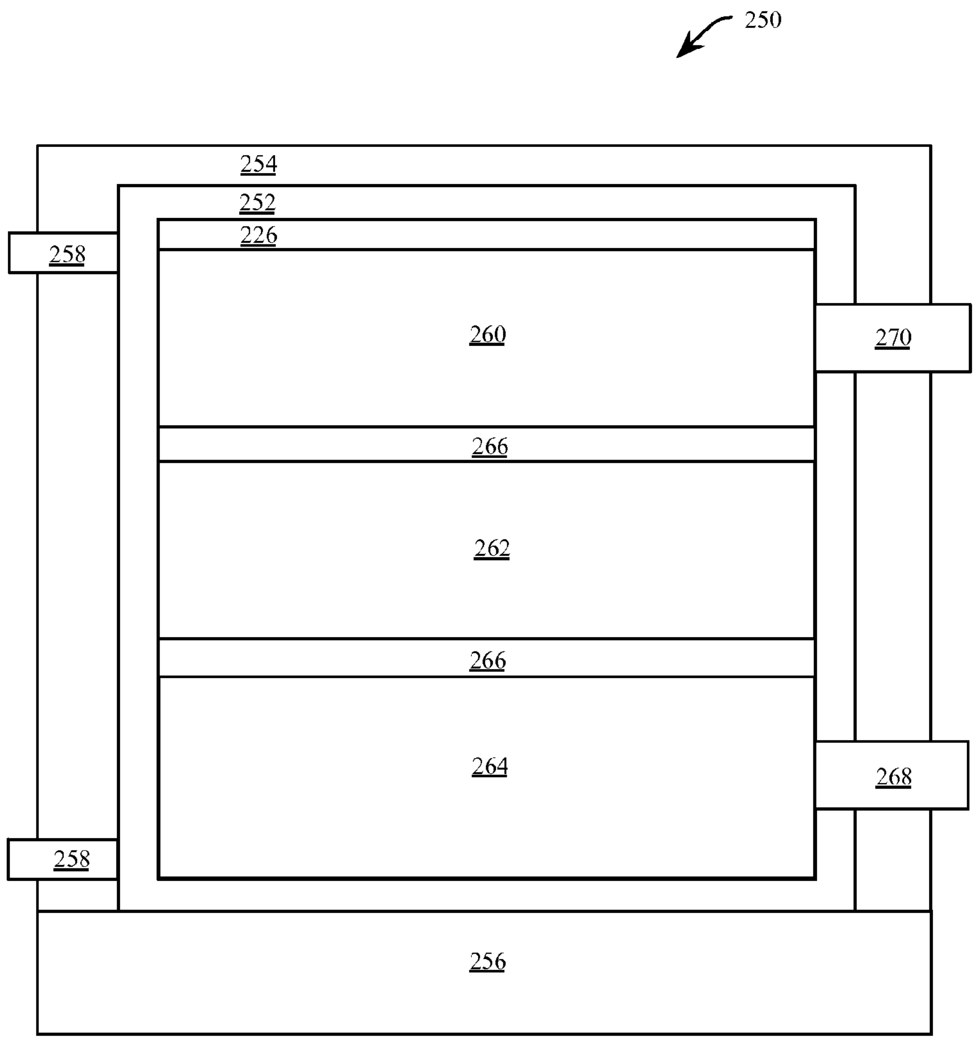
FIG. 4 schematically illustrates an embodiment of a data module for operation as one of a plurality of modules comprising a data recording and data recovery system according to the present invention.

Many different physical configurations of data recording modules and arrangements of components therein are possible within the scope of the present invention. In one embodiment, the data recording modules are configured as rectangular solids than in one further embodiment have chamfered or rounded edges and corners. In other embodiments the modules comprise a spherical ovoid, cylindrical, toroidal or conical configurations. In one embodiment, the volume of each module is no more than 4,000 cubic centimeters. In another embodiment the volume of each module is no more than 2,000 cubic centimeters. To support a general description of some aspects of data module design according to the present invention, FIG. 4 schematically represents an illustrative embodiment of a physical configuration for a data recording module 250 for operation as one of a plurality of modules comprising a data recording and data recovery system according to the present invention. The system is mounted to a structural platform that can be any of the structural platforms disclosed hereinabove according to the present invention. Only the one module 250 and no connected external components or larger scale systems are illustrated in FIG. 4.

In an embodiment, the module 250 comprises a structural container 252 surrounded by a protective envelope 254 that can comprise one or more protective layers of materials to protect the module in event of a catastrophic event associated with the platform to which the module 250 is mounted. The protective materials can comprise one or more of a shock-absorbing material, a thermally insulating material, a waterproof layer, a pressure or vacuum seal, a sacrificial thermal ablative layer such as a Phenolic Impregnated Carbon Ablator (PICA) or cork, and any other materials known in this art to protect objects from damage during or following a catastrophic event. In an embodiment, the protective envelope also comprises a crushable material 256 for absorbing the energy of an impact. In an embodiment, the crushable material 256 comprises a specific portion (a crush zone) of the protective envelope 254, and the module 250 is configured so that if allowed to fall from a height above the Earth, it will orient itself with the crush zone facing downward.

In an embodiment, the structural container 252 comprises an open frame of structural members. In one embodiment the open frame comprises box beams that are one or more of welded together and reinforced at corners of the frame. In another embodiment, the structural container 252 comprises a plurality of structural panels such as panels of solid or honeycomb construction. In an embodiment, the structural container 252 comprises one of an extrusion, a casting and a stereolithographically printed 3-dimensional structure.

Any means of securely mounting the module 250 to the platform can be used in a system according to the present invention. In one embodiment, one or more fastener access point 258 is provided through the protective envelope 254 for fixing the module 250 to the platform. In another embodiment, the module 250 is mounted to the platform at one or more exterior portion of the envelope 254. In yet another embodiment, the module 250 is configured to break free of its mounting if exposed to predetermined stresses that might be encountered with the occurrence of a catastrophic event.

The module is seen to further comprise an interface section 260 that in one embodiment comprises the functionality of the first 212 and the second communications interface 216 disclosed hereinabove. The interface section 260 is also seen to comprise the one or more antenna 226 as disclosed hereinabove.

The module 250 yet further comprises a data processing and data storage section 262 that in an embodiment comprises the functionality of the data processing and data storage section 206 disclosed hereinabove, and an energy storage section 264 that in an embodiment comprises the functionality of the energy storage section 208 disclosed hereinabove. These internal sections can be arranged and configured in any manner supporting structural integrity and durability of the module 250 if a catastrophic event occurs. In one embodiment, the interface section 260, the data processing and data storage section 262 and the energy storage section 264 are configured as a plurality of layers, as illustrated in FIG. 4, separated by shock-absorbing padding 266. In an embodiment, each of the layers comprises a circuit board.

The energy storage section 264 is seen to also comprise a power coupling port 268 that in an embodiment comprises the functionality disclosed for the power coupling port 234 as disclosed hereinabove. The interface section 260 is seen to comprise one or more communications port 270 that in an embodiment the functionality of the storage network port 214 and the data network port 218 disclosed hereinabove. The power coupling port 268 and the one or more communications port 270 are illustrated in FIG. 4 as adjacent the respective energy storage section 264 and interface section, but these ports can be individually located anywhere about the surface of the module 250, for example, as driven by mechanical constraints or tradeoffs associated with the design of a system according to the present invention for a particular platform.

Relative to a data recording and recovery system comprising a single data recording module, data storage and recovery systems according to the present invention advantageously provide a plurality of data recording modules that can be individually recovered following a catastrophic event associated with a platform to which the modules are mounted, thereby increasing the probability that recorded data can be recovered for analysis, to determine one or more of a cause and a history of the catastrophic event. Also advantageously, embodiments of data storage and recovery systems according to the present invention provide data communication and mutual tracking of modules among a plurality of modules following a catastrophic event, thereby increasing the probability of locating additional modules once a first module is located, and potentially providing hitherto unavailable data for building a dynamic model of the catastrophic event.

Data recording and recovery systems according to the present invention comprise a plurality of small, lightweight modules that advantageously can be efficiently mounted in otherwise unused locations about a structural platform, thereby increasing the efficiency of using cargo space in the platform relative to bulky and massive conventional data recovery systems.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A data recording and recovery system comprising:

a plurality of data storage modules distributed among a respective plurality of physical locations about a structural platform; each module comprising a first communications interface for receiving data from the platform and for data communication among the plurality of modules during operation of the platform; a data storage device for storing at least a portion of the received data; and a second communications interface for wireless tracking of a trajectory of another of the plurality of modules; wherein the wireless tracking is enabled upon occurrence of a catastrophic event associated with the platform.

2. The system of claim 1 wherein the structural platform is selected from the group consisting of a spacecraft, an orbital platform and an aircraft.

3. The system of claim 1 wherein the structural platform is selected from the group consisting of a watercraft, a ground vehicle, and an industrial facility.

4. The system according to claim 1 wherein the second interface comprises a wireless data transceiver for data communication among the plurality of modules.

5. The system of claim 1 wherein the second communications interface comprises a transponder for communication between one or more of the plurality of modules and a global positioning system.

6. The system of claim 1 wherein the tracking comprises a first module of the plurality of modules detecting and recording one or more of a geographical location, a trajectory and a velocity of a second module of the plurality of modules.

7. The system of claim 1 wherein each of the modules is configured to generate a wireless locator signal to facilitate recovery of the module after it comes to rest following the catastrophic failure of the platform.

8. The system of claim 1 wherein the first communications interface for each of the plurality of modules comprises one or more of a wired data port and an optical data port.

9. The system of claim 1 wherein the data comprises one or more of electronic sensor data generated on the platform, data representing an operational condition of the platform, acoustic data, and video data.

10. The system of claim 9 wherein the sensor data comprises one or more of temperature data, pressure data, chemical composition data and chemical concentration data.

11. The system of claim 1 wherein only a portion of all of the data received by the plurality of modules is stored in each module, and wherein the entirety of the data can be reconstructed from the portions of data stored by fewer than the plurality of data modules.

12. The system of claim 1 wherein the plurality of modules comprises at least four modules.

13. The system of claim 1 wherein the plurality of modules comprises at least six modules.

14. The system of claim 1 wherein each module is hardened to preserve data recorded therein upon one or more of exposure to vacuum, immersion in an aqueous medium, physical shock, temperatures as low as −20 degrees Celsius, and temperatures as high as 200 degrees Celsius.

15. The system of claim 1 wherein each of the modules is hardened to preserve data recorded therein following a fall from earth orbit through atmospheric reentry and to the earth's surface.

16. A method for recovering recorded electronic data generated on board a vehicle after the vehicle has undergone a catastrophic event, the vehicle comprising a plurality of electronic data recording modules containing the data, the method comprising:

detecting by a first module of a plurality of modules, a second module among the plurality of modules using a wireless communications system integrated with the first module;

acquiring and recording by the first module, tracking data defining a trajectory of the second module; recovering the first module after the first module has come to rest following the catastrophic event; reading the tracking data recorded by the first module; and predicting a location at which the second module is likely to have come to rest, based on the trajectory of the second module included in the tracking data.

17. The method of claim 16 further comprising acquiring and recording data from a global positioning system for determining a location of at least one of the first and the second module.

18. The method of claim 16 wherein the wireless communications system operates in a first operating mode during an initial predetermined time interval following the failure; and the communications system operates in a second operating mode after the predetermined time interval; the second operating mode comprising lower power consumption than the first operating mode.

19. A data recording and recovery system comprising:

a plurality of data storage modules distributed among a respective plurality of physical locations about a structural platform; each module configured for receiving and recording electronic data generated on the platform while each module is positioned at its respective location; each module configured for, upon a catastrophic failure of the platform, wireless tracking of a trajectory of another of the plurality of modules, wireless communication with a global positioning system, and generation of a wireless locator signal to facilitate recovery of the module when it comes to rest following the catastrophic failure.

20. The system of claim 19 wherein the electronic data comprises one or more of a signal generated by a sensor on the platform, an audio signal generated aboard the platform, a video signal generated aboard the platform and a signal generated due to an action by personnel aboard the platform.

21. The system of claim 19 wherein the wireless tracking comprises detecting and recording one or more of a geographical location, a trajectory and a velocity of the other one of the plurality of modules.

22. A data recording and data recovery module for mounting to a structural platform, the module being one of a plurality of modules in a data communications network, the module comprising:

a first electronic interface configured for receiving data generated on the platform and for sharing the data among the plurality of modules;

a data storage device for storing at least a portion of the received data;

a second communications interface configured for operation following a catastrophic failure of the platform; the second interface configured for wireless communication between the module and a global positioning system and for wireless tracking of a trajectory of another of the plurality of modules; and a housing substantially encapsulating the module; the housing being hardened to protect the module from damage associated with the catastrophic failure.

23. The module of claim 22 wherein the wireless tracking comprises detecting and recording one or more of a location, a trajectory and a velocity of another of the plurality of modules.

* * * * *